(12) United States Patent
Satake et al.

(10) Patent No.: US 7,161,324 B1
(45) Date of Patent: Jan. 9, 2007

(54) DEVICE FOR ESTIMATING POLE POSITION OF SYNCHRONOUS MOTOR

(75) Inventors: Akira Satake, Tokyo (JP); Yoshihiko Kinpara, Tokyo (JP); Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/554,553

(22) PCT Filed: Jul. 16, 2003

(86) PCT No.: PCT/JP03/09031

§ 371 (c)(1),
(2), (4) Date: Oct. 27, 2005

(87) PCT Pub. No.: WO2005/008879

PCT Pub. Date: Jan. 27, 2005

(51) Int. Cl.
*H02P 6/18* (2006.01)
*H02P 1/24* (2006.01)

(52) U.S. Cl. ............... 318/720; 318/721; 318/723; 318/727

(58) Field of Classification Search ........... 318/138, 318/245, 254, 439, 720–729, 800–813; 363/34–39
See application file for complete search history.

(56) References Cited

U.S. PATENT DOCUMENTS

| | | | | |
|---|---|---|---|---|
| 4,388,577 A | * | 6/1983 | Blaschke et al. | 318/717 |
| 4,626,761 A | * | 12/1986 | Blaschke | 318/803 |
| 4,680,526 A | * | 7/1987 | Okuyama et al. | 318/802 |
| 4,763,058 A | * | 8/1988 | Heining et al. | 318/807 |
| 4,884,023 A | * | 11/1989 | Schmidt et al. | 324/772 |
| 5,481,172 A | * | 1/1996 | Minowa et al. | 318/800 |
| 5,936,370 A | * | 8/1999 | Fukao et al. | 318/652 |
| 6,396,229 B1 | * | 5/2002 | Sakamoto et al. | 318/439 |
| 6,531,843 B1 | * | 3/2003 | Iwaji et al. | 318/727 |
| 6,628,099 B1 | * | 9/2003 | Iwaji et al. | 318/700 |
| 6,639,377 B1 | * | 10/2003 | Iwaji et al. | 318/700 |
| 6,650,081 B1 | * | 11/2003 | Iwaji et al. | 318/700 |
| 6,700,343 B1 | * | 3/2004 | Masaki et al. | 318/434 |
| 6,844,697 B1 | * | 1/2005 | Masaki et al. | 318/721 |

(Continued)

FOREIGN PATENT DOCUMENTS

JP 07-245981 9/1995

(Continued)

*Primary Examiner*—Paul Ip
(74) *Attorney, Agent, or Firm*—Leydig, Voit & Mayer, Ltd.

(57) ABSTRACT

An influence resulting from double saliency of an electric motor, i.e., an influence of a deviation of the axis of an alternating current due to a rotor magnetic pole position θ on the estimation of a magnetic pole position, is eliminated, and, in particular, the magnetic pole position of a double saliency electric motor can be estimated with high precision. To this end, an alternating voltage impression section impresses an alternating voltage on an electric motor, a current detection section detects a motor current, a reference direction generation section outputs an instantaneous reference direction θ' from a rotor magnetic pole position θ of the electric motor, a vector conversion section separates the detected current into a parallel component and a quadrature component with respect to the reference direction θ', and a magnetic pole position estimation section estimates actual rotor magnetic pole position θ of the electric motor based on at least one of the parallel component and the quadrature component of the current.

6 Claims, 11 Drawing Sheets

U.S. PATENT DOCUMENTS

| | | | | |
|---|---|---|---|---|
| 2002/0060548 A1* | 5/2002 | Iwaji et al. | ................. | 318/727 |
| 2003/0020428 A1* | 1/2003 | Masaki et al. | .............. | 318/727 |
| 2003/0020429 A1* | 1/2003 | Masaki et al. | .............. | 318/727 |
| 2004/0257027 A1* | 12/2004 | Matsuo et al. | .............. | 318/722 |
| 2006/0192510 A1* | 8/2006 | Okazaki et al. | ............. | 318/139 |

FOREIGN PATENT DOCUMENTS

| | | |
|---|---|---|
| JP | 10-341599 | 12/1998 |
| JP | 2000-152687 | 5/2000 |
| JP | 2001-095281 | 6/2001 |

* cited by examiner

DEVICE FOR ESTIMATING POLE POSITION OF SYNCHRONOUS MOTOR

TECHNICAL FIELD

The present invention relates to a magnetic pole position estimation apparatus for a synchronous motor which serves to estimate the rotor magnetic pole position of a double salient pole electric motor such as a permanent magnet motor, a synchronous reluctance motor, etc., in which a rotor and a stator of an alternating current synchronous electric motor have electric saliency.

BACKGROUND ART

In synchronous motors (hereinafter simply referred to as "electric motors") such as permanent magnet motors, synchronous reluctance motors, etc., it is necessary to supply an appropriate current to a stator in accordance with the position of a rotor magnetic pole, and hence a rotor magnetic pole position sensor is fundamentally required for driving such a motor. In the case of using such a rotor magnetic pole position sensor, however, there are problems such as an increase in the cost, reduction in reliability and durability, an increase in electric wiring, etc., so a sensorless control system is desired which uses no rotor magnetic pole position sensor. In order to solve these problems, there has been disclosed, for example, a technique as described in a first patent document (Japanese patent No. 3312472).

A conventional apparatus disclosed in the first patent document includes an alternating voltage impression section that impresses an alternating voltage to an electric motor, a current detection section that detects a motor current, a vector conversion section that divides the detected motor current into a parallel component and a quadrature component with respect to the alternating voltage to be impressed, and a magnetic pole position estimation section that estimates the rotor magnetic pole position of the electric motor based on at least one of the parallel component and the quadrature component of the motor current.

In the above-mentioned conventional apparatus, when there exists a phase difference (phase difference angle θ in the first patent document between the direction in which the alternating voltage is impressed and the direction of magnetic poles, for example, as shown in expression 8 in the first patent document, the position of a rotor magnetic pole is estimated by using a phenomenon that an alternating current with an amplitude proportional to sin 2 θ in a direction (a qc axis direction in the first patent document) orthogonal to the impressed alternating voltage (in a dc axis direction in the first patent document).

The reason for the occurrence of such a phenomenon is that in general, in electric motors with saliency, the inductance in the rotor magnetic pole direction becomes maximum (positive saliency) or minimum (inverse saliency). However, in actual electric motors, even if the direction in which the alternating voltage is impressed and the actual magnetic pole direction coincide with each other, there might be generated an alternating current in a direction orthogonal to the alternating voltage.

FIG. 4 illustrates one such an example with the result of experiments, in which when a rotor magnetic pole position and an alternating voltage impression direction coincide with each other, the change of the amplitude of current in a direction orthogonal to the rotor magnetic pole position according to an alternating voltage is shown.

In FIG. 4, the axis of abscissa represents time [s], and the axis of ordinate represents the rotor magnetic pole position (thin line) in electrical angle [10/360 degrees] and the current amplitude (thick line) [A]. As clear from FIG. 4, it is found that the current amplitude varies in a periodic manner in accordance with the change of the rotor magnetic pole position in spite of that the direction in which the alternating voltage is impressed and the rotor magnetic pole position coincide with each other.

The reason for the generation of this phenomenon is that in an actual electric motor, the direction of the rotor magnetic pole position and the direction of a minimum inductance (or a maximum inductance) do not coincide with each other, and the amount of deviation therebetween varies according to the rotor magnetic pole position.

FIG. 5 shows the section of an embedded permanent magnet electric motor used in the experiment of FIG. 4, and eight rectangular parts of the rotor are permanent magnets embedded therein. The rotor of this electric motor has eight poles, and a stator thereof comprises a concentrated winding armature having twelve slots. It is known that the embedded permanent magnet electric motor is not axisymmetric in the magnetic circuit configuration of the rotor and has electric saliency because of the embedded arrangement of the embedded permanent magnet.

FIG. 6 shows a simplified iron core structure of the electric motor of FIG. 5 while taking out only one pair of poles therefrom. However, note that though the embedded permanent magnet electric-motor of FIG. 5 has inverse saliency in which inductance is minimum in the rotor magnetic pole direction (rotor magnetic pole position), the electric motor model of FIG. 6 has positive saliency in which inductance is maximum in the rotor magnetic pole direction. In this regard, the difference between the inverse saliency and the positive saliency of the electric motor is merely that the magnetic pole directions defined are displaced by 90 degrees in electrical angle from each other.

Here, let us consider the change in inductance of the electric motor according to the axis of observation separately with respect to the stator and the rotor.

First of all, considering the inductance change in case of the absence of saliency in the rotor of the electric motor of FIG. 6, the inductance is uniquely decided by the direction of the observation axis on the stator irrespective of the rotor magnetic pole position, as shown in FIG. 7.

In FIG. 7, an inductance on an observation axis γ=0 and an inductance on an observation axis γ=π/3(=60 degrees) become equal to each other because the relative positional relations between these observation axes and the core of the stator are identical with each other.

In contract to this, the inductance on an observation axis γ=0 and an inductance on an observation axis γ=π/6(=30 degrees) do not necessarily become equal to each other because the relative positional relations between these observation axes and the core of the stator are different from each other.

Here, let us assume that the inductance in the observation axis direction varies on the observation axis γ=0 and on the observation axis γ=π/6(=30 degrees), and that the inductance in the observation axis direction changes monotonously from γ=0 to γ=π/6(=30 degrees) and from γ=π/6(=30 degrees) to γ=π/3(=60 degrees). At this time, it is considered that the change in the inductance according to the observation axis in the model shown in FIG. 7 varies at a period of 60 degrees in electrical angle, as shown by a broken line in FIG. 8.

Although various contrivances are made in the motor design so as to reduce such variation as much as possible, it is particularly difficult to decrease this variation to zero in a concentrated winding armature as shown in FIG. 6.

It is considered that the stator of an electric motor with a large inductance change as stated above has saliency, and, the electric motor of the structure as shown in FIG. 6, of which both the rotor and the stator have saliency, is called a double-salient electric motor.

Next, when considering the change in inductance in case of the absence of saliency in a stator, as shown in FIG. 9, the inductance is decided by an angle between a rotor magnetic pole position and an observation axis.

In FIG. 9, an inductance on an observation axis $\delta=0$ and an inductance on an observation axis $\delta=\pi(=180$ degrees) become equal to each other because the relative positional relations between these observation axes and the core of the stator are identical with each other.

In contract to this, the inductance on an observation axis $\delta=0$ and an inductance on an observation axis $\delta=\pi/2(=90$ degrees) do not necessarily become equal to each other because the relative positional relations between these observation axes and the core of the stator are different from each other.

Here, it is considered that assuming that the inductance in the observation axis direction changes monotonously from $\delta=0$ to $\delta=\pi/2(=90$ degrees) and from $\delta=\pi/2(=90$ degrees) to $\delta=\pi(=180$ degrees), the change in the inductance according to the observation axis in the model shown in FIG. 9 varies at a period of 180 degrees in electrical angle, as shown by a thin line in FIG. 8.

The characteristic of the inductance change according to the observation axis of the electric motor shown in FIG. 6 is obtained by combining the above-mentioned two inductance characteristics with each other.

FIG. 8 shows a stator-induced inductance (thin line), a rotor-induced inductance (broken line) and a combined inductance (thick line) when the rotor magnetic pole position $\theta$ is zero ($\theta=0$) (a U phase winding and the rotor magnetic pole are confronted with each other). However, in FIG. 8, it is assumed that the magnitude of each inductance is normalized.

In the state of FIG. 8, the direction of the rotor salient pole and the maximum direction of the combined inductance coincide with each other, and a maximum inductance is reached at electrical angles of 0 and $\pi(=180$ degrees).

In contrast to this, FIG. 10 shows the characteristic of the inductance change according to the observation axis of each inductance in case of the rotor magnetic pole direction (rotor magnetic pole position) $\theta=\pi/12$ ($=15$ degrees).

It is found that in the state of FIG. 10, there arises an amount of deviation (deviation angle) between the rotor magnetic pole direction (the maximum direction of the rotor inductance) and the maximum direction of the combined inductance.

FIG. 11 shows the change of a deviation angle between the rotor magnetic pole direction and the maximum direction of the combined inductance when the rotor magnetic pole direction $\theta$ is changed from 0 up to $\pi(=180$ degrees).

As is clear from FIG. 11, it is found that the deviation angle periodically changes in a period of an electrical angle of 60 degrees. Accordingly, it is considered that in an electric motor with a double salient pole characteristic as shown in FIG. 6, the deviation angle between the rotor magnetic pole direction and the maximum direction of the combined inductance is generated 6 times or periods during one electrical angle revolution (0–360 degrees).

In addition, as can be seen from FIG. 10, a similar phenomenon occurs with respect to a direction advanced 90 degrees from the rotor magnetic pole direction (i.e., the rotor inverse-salient pole direction) and the minimum combined inductance direction.

Thus, it is considered that, as in the experiments of FIG. 4, when the rotor is driven to run with an alternating voltage being impressed in the rotor magnetic pole direction (i.e., the rotor inverse-salient pole direction), a deviation angle equal to 6 periods is generated for one revolution in electrical angle between the direction of impression of the alternating voltage and the minimum direction of the combined inductance, as a result of which an alternating current is generated in a direction orthogonal to the alternating voltage, as shown in FIG. 4.

Accordingly, the present invention is intended to obviate the problems as referred to above, and provide a magnetic pole position estimation apparatus for a synchronous motor which is capable of estimating the magnetic pole position of a rotor in a precise manner even in an electric motor with so-called double saliency by removing an influence resulting from the double saliency of the electric motor, i.e., an influence of a deviation of the axis of an alternating current due to the rotor magnetic pole position on the estimation of the magnetic pole position.

DISCLOSURE OF THE INVENTION

A magnetic pole position estimation apparatus for a synchronous motor according to one aspect of the present invention includes: an alternating voltage impression section for impressing, an alternating voltage to an electric motor; a current detection section for detecting a current flowing through the electric motor in response to the alternating voltage; a reference direction generation section for adding a predetermined amount of deviation corresponding to a rotor magnetic pole position of the electric motor to the rotor magnetic pole position thereby to output a reference direction; a vector conversion section for separating the motor current detected by the current detection section into a parallel component and a quadrature component with respect to the reference direction; and a magnetic pole position estimation section for estimating an actual rotor magnetic pole position of the electric motor based on at least one of the parallel component and the quadrature component of the motor current.

In addition, a magnetic pole position estimation apparatus for a synchronous motor according to another aspect of the present invention includes: an alternating voltage impression section for impressing an alternating voltage to an electric motor; a current detection section for detecting a current flowing through the electric motor in response to the alternating voltage; a reference direction generation section for adding a predetermined amount of deviation corresponding to a rotor magnetic pole position of the electric motor and a stator current thereof to the rotor magnetic pole position thereby to output a reference direction; a vector conversion section for separating the motor current detected by the current detection section into a parallel component and a quadrature component with respect to the reference direction; and a magnetic pole position estimation section for estimating an actual rotor magnetic pole position of the electric motor based on at least one of the parallel component and the quadrature component of the motor current.

Moreover, a magnetic pole position estimation apparatus for a synchronous motor according to a further aspect of the present invention includes: an alternating voltage impression direction generation section for adding a predetermined amount of deviation corresponding to a rotor magnetic pole position of an electric motor to the rotor magnetic pole position thereby to output a reference direction corresponding to an alternating voltage impression direction; an alternating voltage impression section for impressing an alternating voltage to the electric motor in the alternating voltage impression direction of the electric motor; a current detection section for detecting a current flowing through the electric motor in response to the alternating voltage; a vector conversion section for separating the motor current detected by the current detection section into a parallel component and a quadrature component with respect to the rotor magnetic pole position; and a magnetic pole position estimation section for estimating an actual rotor magnetic pole position of the electric motor based on at least one of the parallel component and the quadrature component of the motor current.

BEST MODE FOR CARRYING OUT THE INVENTION

Hereinafter, preferred embodiments of the present invention will be described in detail while referring to the accompanying drawings.

Figure 1:
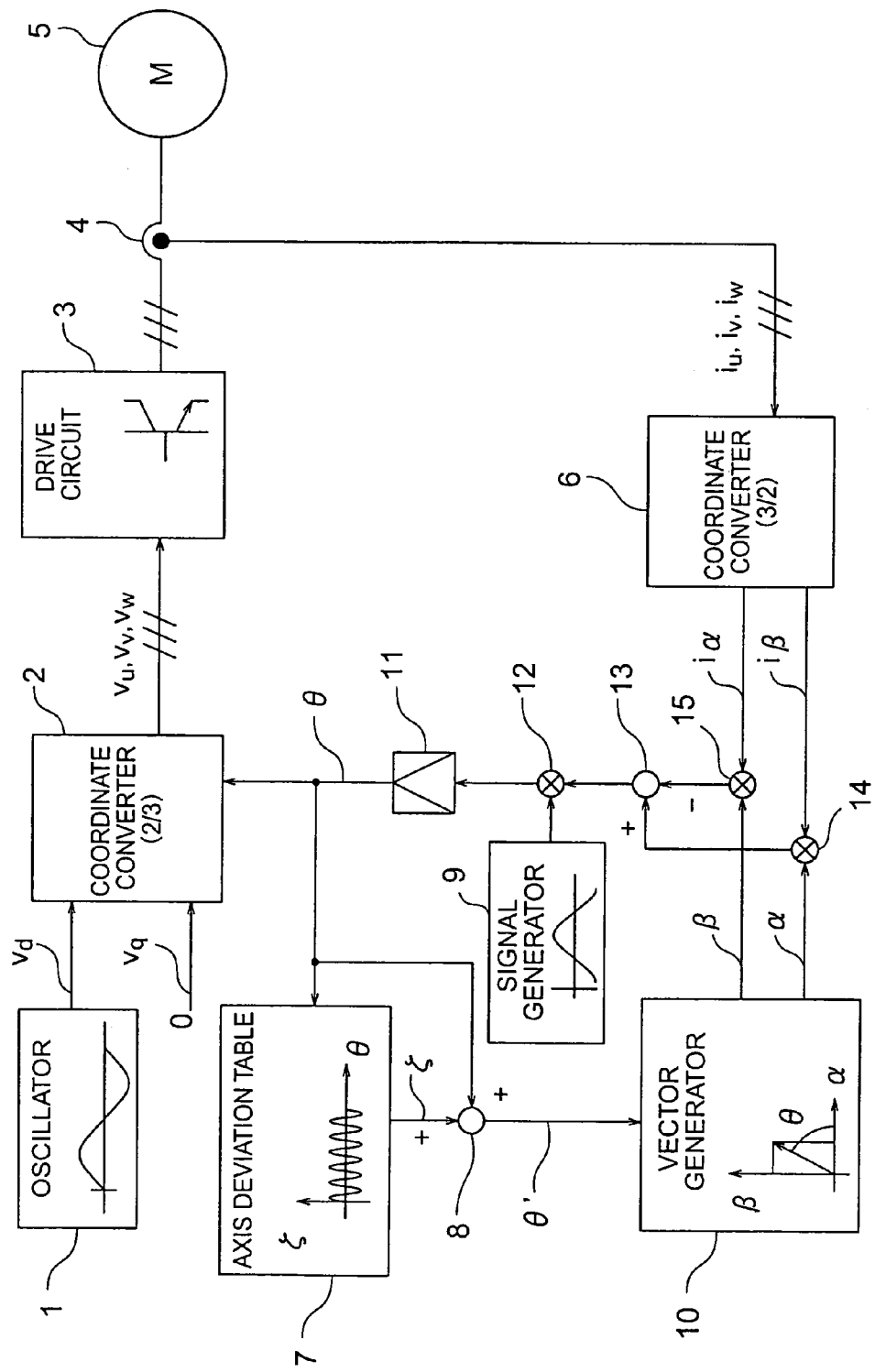
FIG. 1 is a circuit block diagram showing the functional configuration of a magnetic pole position estimation apparatus for a synchronous motor according to a first embodiment of the present invention.

FIG. 1 is a circuit block diagram that shows the functional configuration of a magnetic pole position estimation apparatus for a synchronous motor according to a first embodiment of the present invention.

In FIG. 1, the magnetic pole position estimation apparatus for a synchronous motor according to the first embodiment of the present invention includes an oscillator 1, a coordinate converter 2, a drive circuit 3, a current sensor 4, an electric motor 5, a coordinate converter 6, an axis deviation table 7, an adder 8, a signal generator 9, a vector generator 10, a controller 11, a multiplier 12, a subtracter 13, and multipliers 14, 15.

The oscillator 1 generates a d axis signal Vd in the form of an alternating voltage (dq axes) impressed to the electric motor 5, and the coordinate converter 2 serves to perform coordinate transformation of the alternating voltage (Vd, Vq) of a two axis rotation coordinate system (dq axes) into a voltage (Vu, Vv, Vw) of a three phase fixed coordinate system UVW), and output it as an output voltage command.

The drive circuit 3 impresses a three phase output voltage corresponding to the output voltage command to the electric motor 5, and the current sensor 4 detects a three phase motor current (iu, iv, iw) supplied to the electric motor 5 in accordance with the three phase output voltage.

The coordinate converter 6 constitutes a vector conversion section that serves to separate the motor current into a parallel component and a quadrature component ($\alpha$, $\beta$) with respect to a reference direction (minimum inductance direction $\theta'$), and it coordinate transforms the motor current (iu, iv, iw) into a current vector ($i_\alpha$, $i_\beta$) on two phase fixed coordinates ($\alpha$, $\beta$).

The axis deviation table 7 stores in advance the relation between a rotor magnetic pole position $\theta$ and a deviation angle $\zeta$, and outputs the deviation angle $\zeta$ corresponding to an input value (estimated value) of the rotor magnetic pole position $\theta$.

The adder 8 adds the deviation angle $\zeta$ and the rotor magnetic pole position $\theta$ to each other to provide a minimum inductance direction $\theta'$, and the vector generator 10 calculates a unit reference vector ($\alpha$, $\beta$) in the minimum inductance direction $\theta'$.

The multiplier 14 multiplies an $\alpha$ component of the reference vector ($\alpha$, $\beta$) and a $\beta$ component $i_\beta$ of the current vector ($i_\alpha$, $i_\beta$), the multiplier 15 multiplies a $\beta$ component of the reference vector and an $\alpha$ component $i_\alpha$ of the current vector, and the subtracter 13 subtracts an output value of the multiplier 15 from an output value of the multiplier 14.

The multipliers 14, 15 and the subtracter 13 calculate an outer product of the reference vector ($\alpha$, $\beta$) and the current vector ($i_\alpha$, $i_\beta$) on two phase fixed coordinates, and obtains a component of the current vector ($i_\alpha$, $i_\beta$) orthogonal to the reference vector ($\alpha$, $\beta$).

The signal generator 9 generates a signal at the same frequency as that of the output voltage of the oscillator 1 with its phase being 90 degrees therebehind, and the multiplier 12 multiplies the output signal of the signal generator 9 and the output signal of the subtracter 13 with each other.

The controller 11 estimates the rotor magnetic pole position $\theta$ from the output value of the multiplier 12, and inputs the rotor magnetic pole position θ thus estimated to the coordinate converter 2, the axis deviation table 7 and the adder 8.

Next, reference will be made to the operation of this first embodiment of the present invention, as shown in FIG. 1.

First of all, the alternating voltage Vd generated from the oscillator 1 is input to the coordinate converter 2 as a d axis signal, whereas a ground potential "0" is input to the coordinate converter 2 as a q axis signal Vq.

The coordinate converter 2 converts the input signal (the d axis signal Vd and the q axis signal Vq) in accordance with the rotor magnetic pole position θ (estimated value), and coordinate transforms it from the two axis rotation coordinate system (dq axes) into a voltage output value (Vu, Vv, Vw) of three phase fixed coordinates (UVW).

The transformed output (three phase output voltage commands Vu, Vv and Vw) of the coordinate converter 2 is input to the drive circuit 3 as a voltage command thereof, and the drive circuit 3 impresses a voltage corresponding to the output voltage command to the three phase winding terminals of the electric motor 5.

The motor currents (iu, iv, iw) flowing through the windings of the respective phases (UVW) of the electric motor 5 are detected by the current sensor 4, and a detection signal from the current sensor 4 is converted from the three phase fixed coordinates (UVW) into a current vector ($i_\alpha$, $i_\beta$) of two phase fixed coordinates (αβ axes) through the coordinate converter 6.

Figure 11:
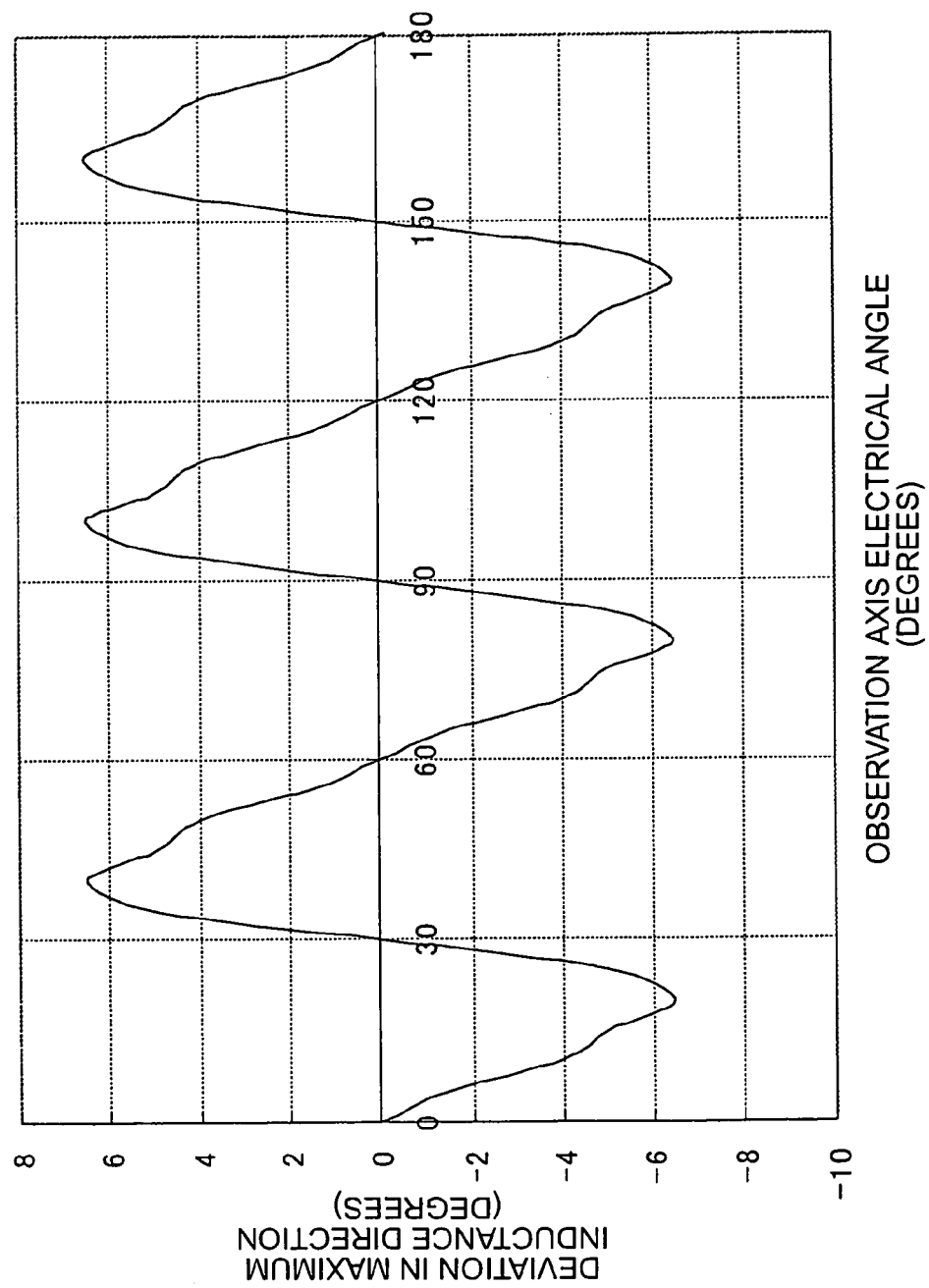
FIG. 11 is an explanatory view showing a change of deviation between a rotor magnetic pole direction and a maximum direction of a combined inductance in the conventional magnetic pole position estimation apparatus for a synchronous motor.

At this time, for instance, in case where the electric motor 5 is a double-salient electric motor (see FIG. 6), there arises an amount of periodic deviation (angle of deviation [degrees]) corresponding to an electric angle between the rotor magnetic pole position θ (the rotor inverse-salient pole direction) and the minimum inductance direction θ' (see FIG. 11).

Figure 7:
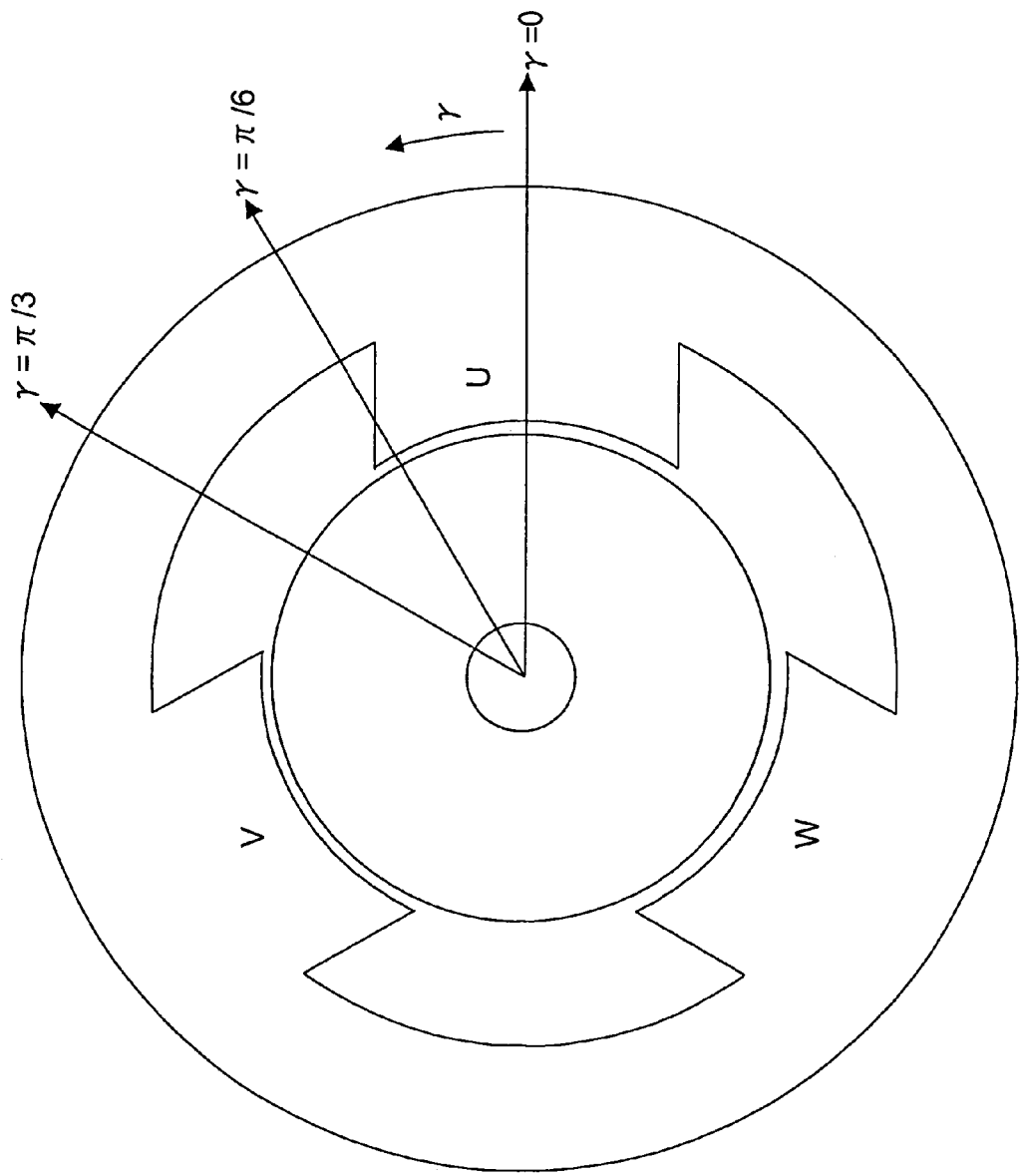
FIG. 7 is a cross sectional view showing the case of the absence of saliency in a rotor in FIG. 6, in which the direction of an observation axis on the stator is shown so as to describe an inductance change.
Figure 8:
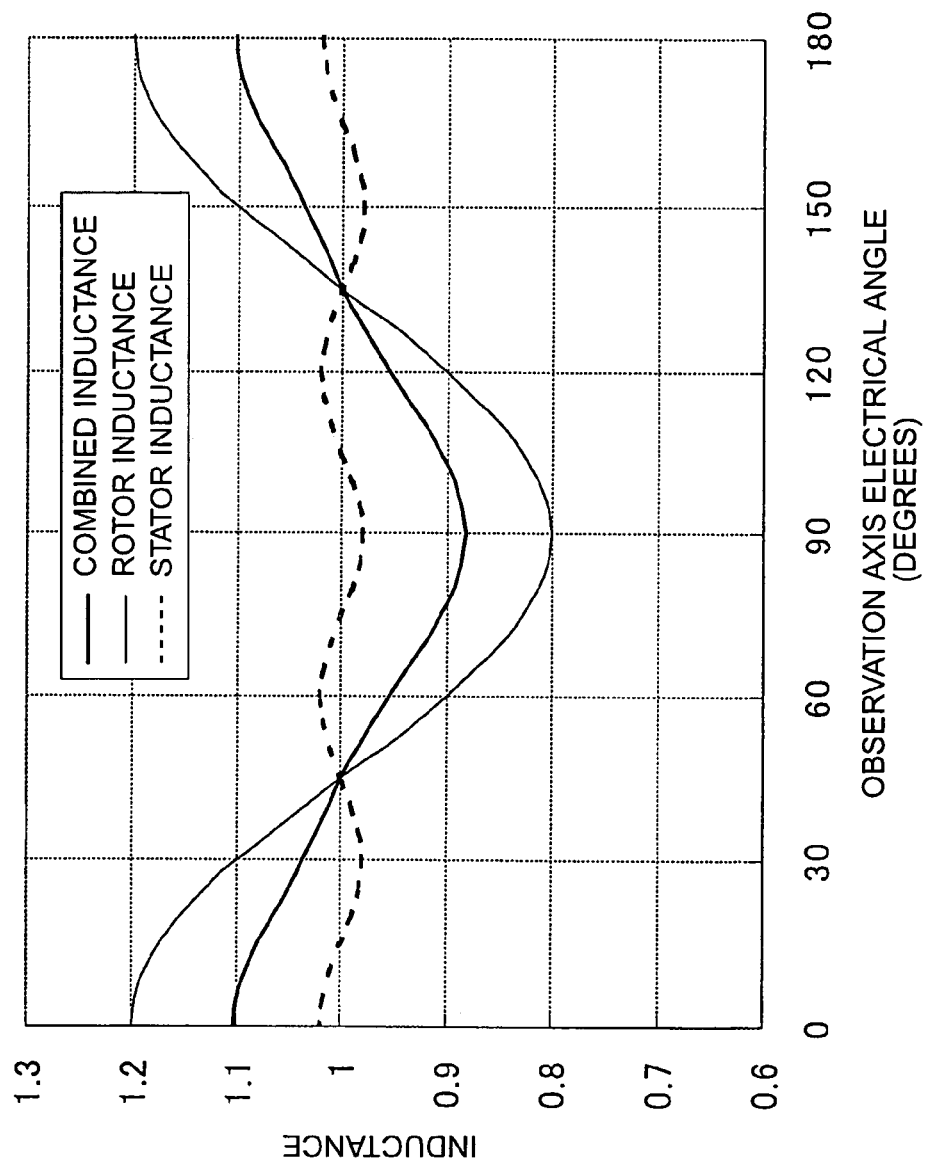
FIG. 8 is an explanatory view showing the inductance change according to the observation axis of an electric motor model shown in FIG. 7.
Figure 9:
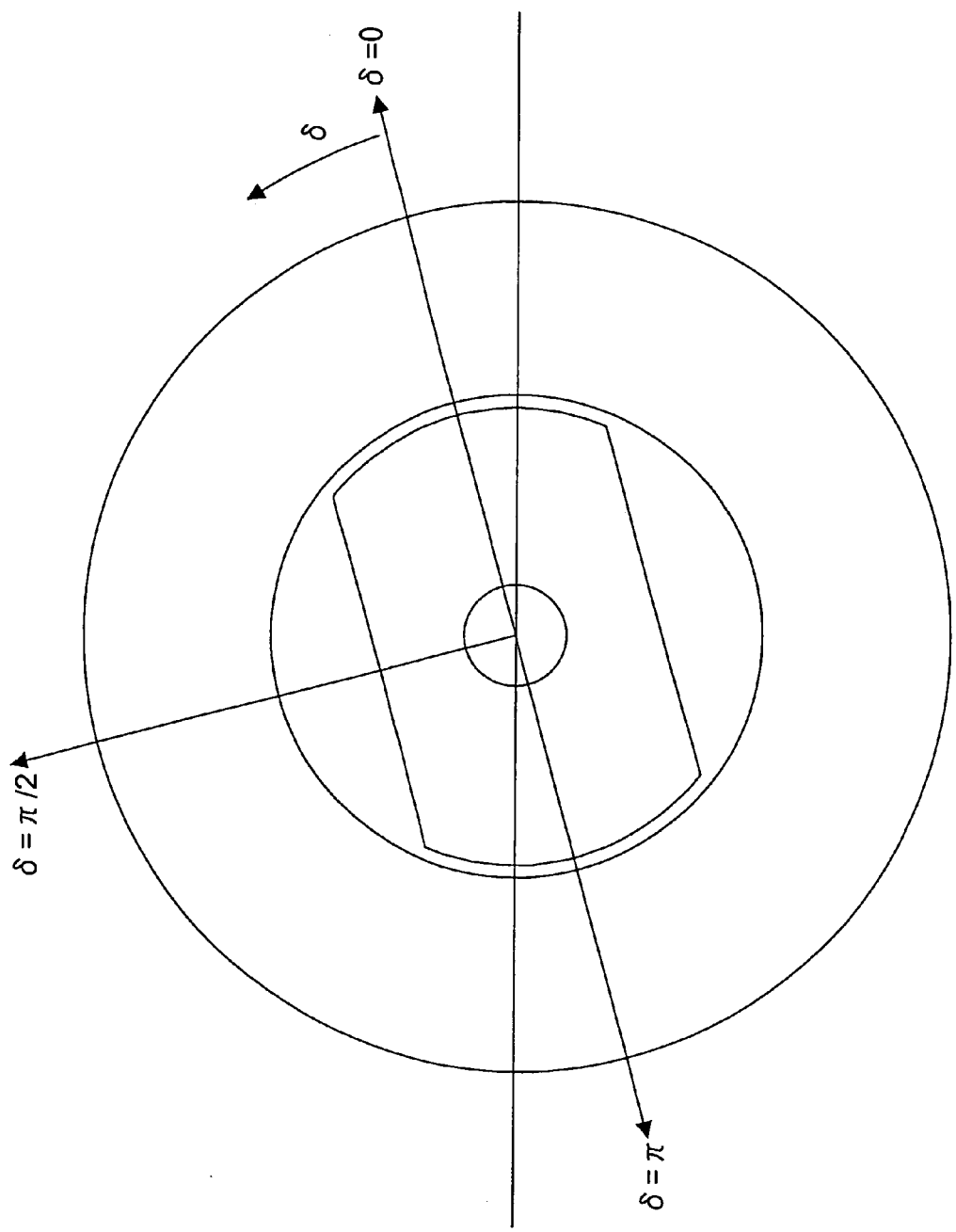
FIG. 9 is a cross sectional view showing the case of the absence of saliency in the stator in FIG. 6, in which an angle between the rotor magnetic pole position and the observation axis is shown so as to describe the inductance change.
Figure 10:
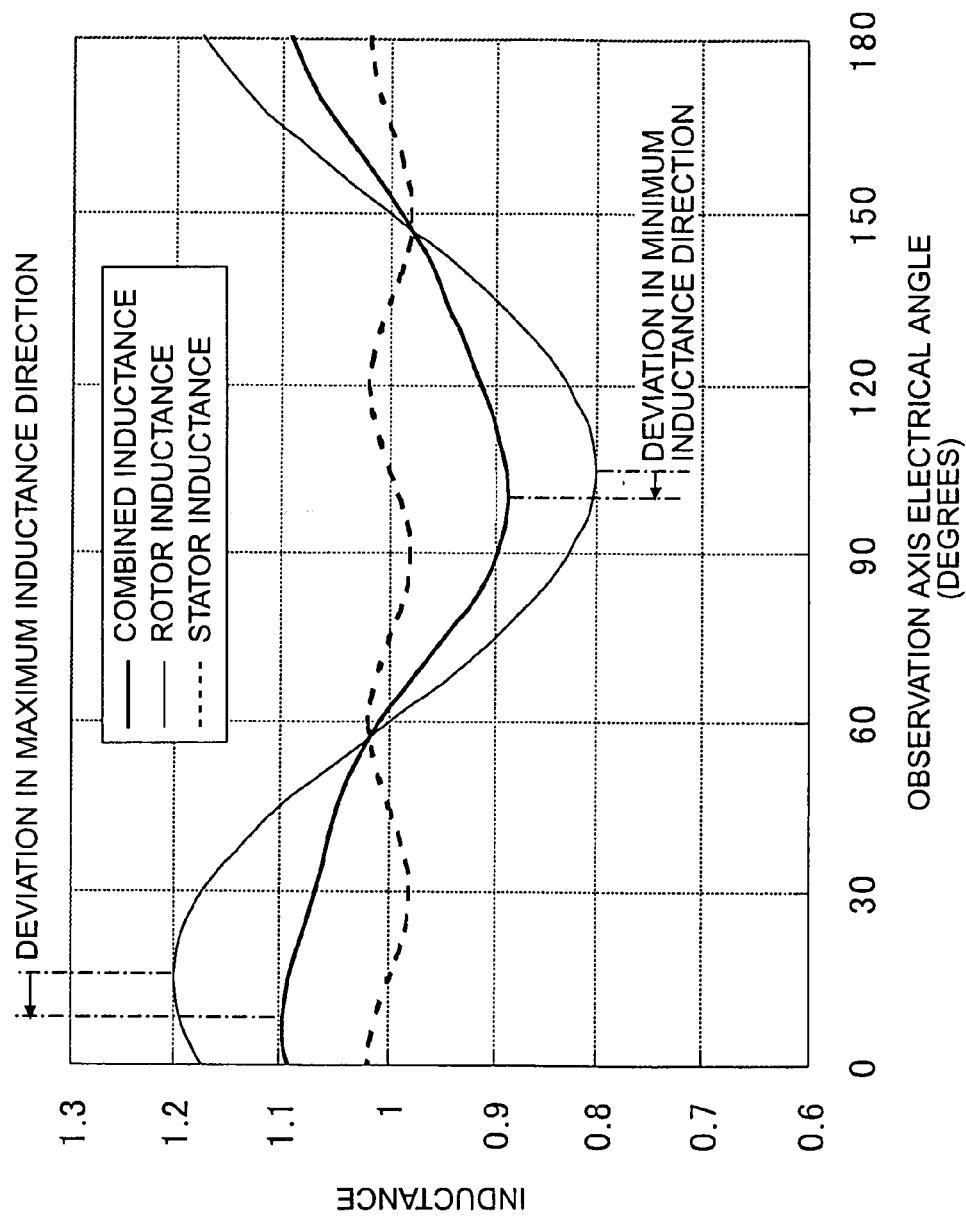
FIG. 10 is an explanatory view showing the characteristic of an inductance change according to each observation axis in a conventional magnetic pole position estimation apparatus for a synchronous motor.

The amount of deviation is generated by the interaction of the rotor in the electric motor 5 and the saliency of the stator, and becomes a value which is determined in accordance with the electrical angle (rotor position) of the observation axis γ (see FIG. 7). Accordingly, if the relation of the amount of deviation to the rotor position is obtained beforehand, it is possible to uniquely determine the minimum inductance direction θ' (the direction in which the inductance is minimized) at a time point of recognition (the present state) by recognizing the rotor magnetic pole position θ.

The axis deviation table 7 beforehand stores, as a table, the relation between the rotor magnetic pole position θ and the deviation angle ζ between the rotor magnetic pole position θ and the minimum inductance axis, and uniquely determines the deviation angle ζ corresponding to the rotor magnetic pole position θ (estimated value).

Subsequently, the adder 8 adds the deviation angle ζ determined by the axis deviation table 7 and the rotor magnetic pole position θ to each other to provide the minimum inductance direction θ'.

Moreover, the vector generator 10 determines a unit reference vector (α, β) on two phase fixed coordinates (αβ axes) which becomes the minimum inductance direction θ'.

Then, the multipliers 14, 15 and the subtracter 13 obtain a component of the current vector ($i_\alpha$, $i_\beta$) orthogonal to the reference vector (α, β) by calculating an outer product of the reference vector (α, β) and the current vector ($i_\alpha$, $i_\beta$) on two phase fixed coordinates.

The signal generator 9 generates a signal which has the same frequency as the output frequency of the oscillator 1 with its phase being 90 degrees behind the phase thereof. Accordingly, the output signal of the signal generator 9 coincides in phase with the alternating current generated by the alternating voltage impressed to the electric motor 5.

The multiplier 12 multiplies the output signal of the signal generator 9 and the output signal of the subtracter 13, i.e., a component of the current vector orthogonal to the reference vector (α, β) (outer product value) thereby to obtain a component of the alternating current generated by the alternating voltage, orthogonal to the reference vector (α, β) (i.e., a component orthogonal to the minimum inductance direction θ').

Here, note that if the estimated rotor magnetic pole position θ and the actual rotor magnetic pole position coincide with each other, the directions of the alternating current generated and the reference vector (α, β) coincide with each other, so the output value of the multiplier 12 becomes "0".

On the other hand, if there is an error or deviation between the estimated rotor magnetic pole position θ and the actual rotor magnetic pole position, the direction of the alternating current generated deviates from the direction of the reference vector (α, β), as a result of which the output value of the multiplier 12 becomes a value corresponding to the error or deviation of the rotor magnetic pole position θ, which is then input to the controller 11.

Figure 4:
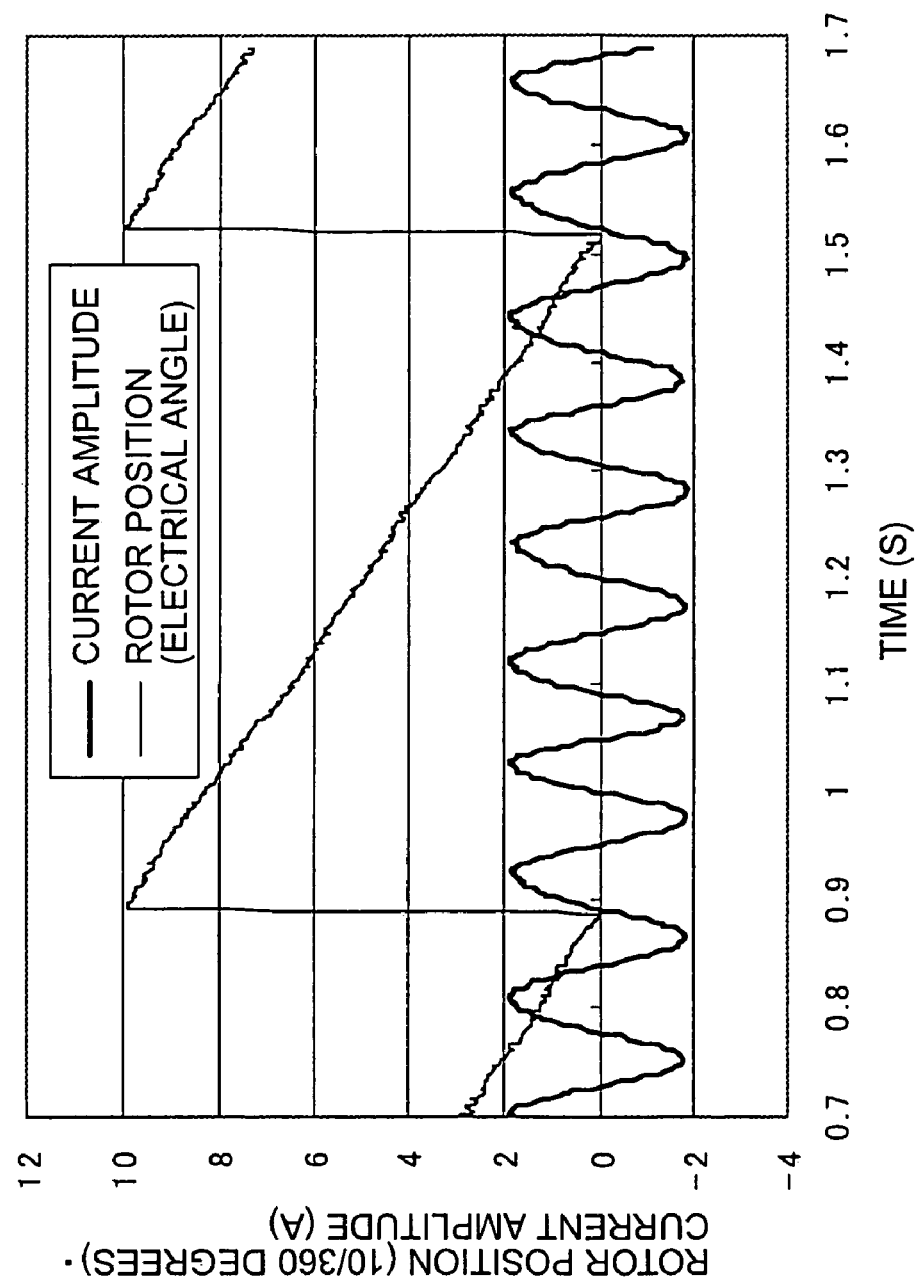
FIG. 4 is an explanatory view showing the operation of a conventional magnetic pole position estimation apparatus for a synchronous motor according to the result of experiments, in which the changes over time of the amplitude of current in a direction orthogonal to an alternating voltage and the rotor magnetic pole position are shown when the rotor magnetic pole position and the direction of impression of the alternating voltage coincide with each other.
Figure 5:
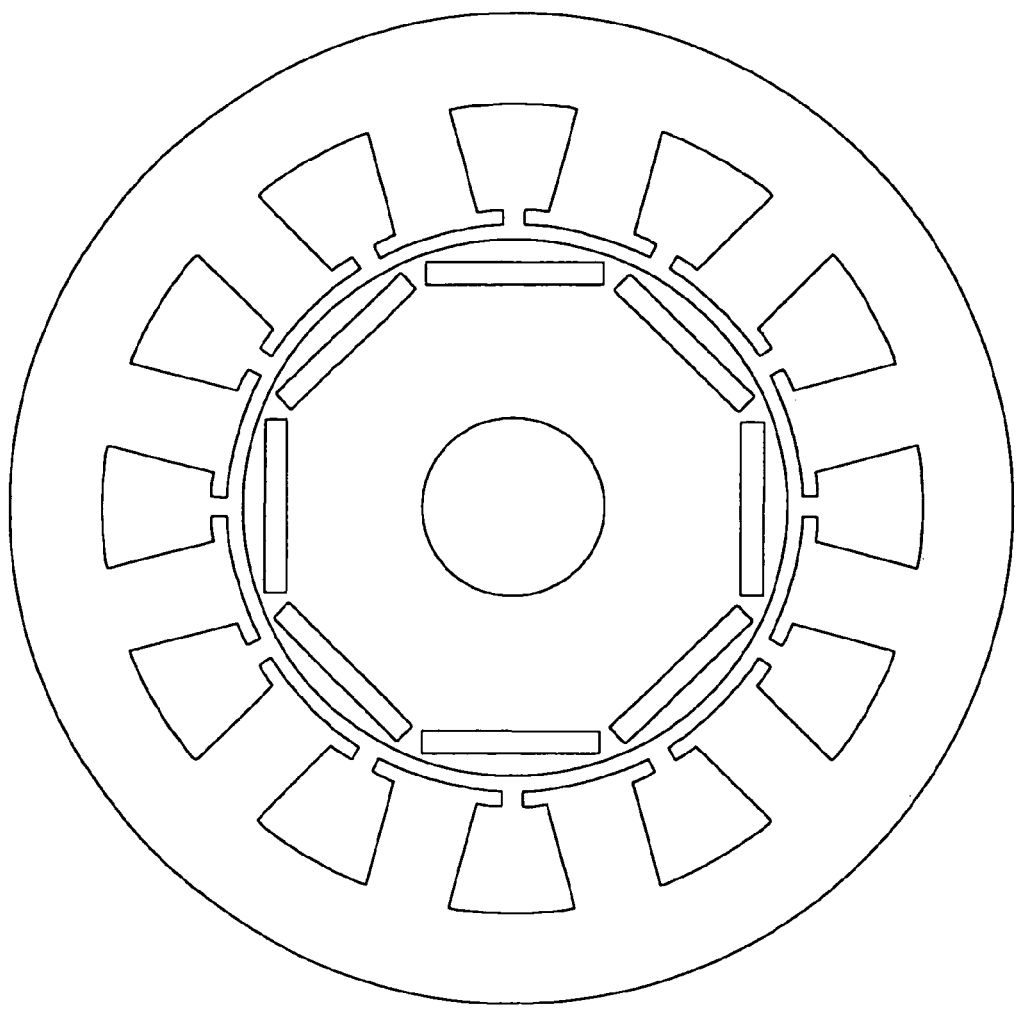
FIG. 5 is a cross sectional view showing an electric motor used for the experiments of FIG. 4.
Figure 6:
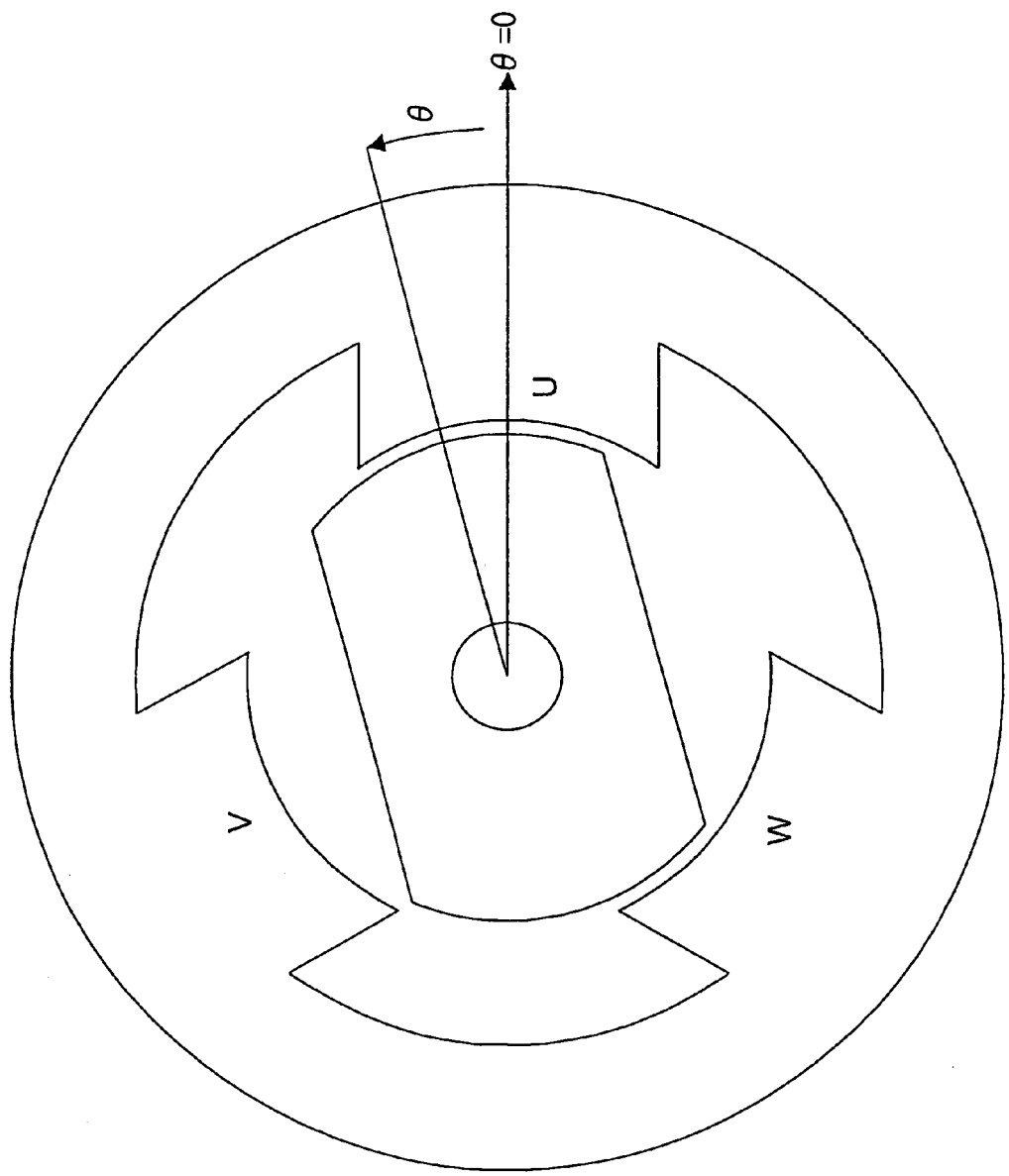
FIG. 6 is a cross sectional view showing a simplified iron core structure of the electric motor of FIG. 5 while taking out only one pair of poles therefrom.

The controller 11 performs an accurate estimation calculation by carrying out appropriate control in accordance with an error signal output from the multiplier 12 thereby to make the estimated rotor magnetic pole position θ coincide with the actual rotor magnetic pole position without receiving the influence of the deviation angle ζ between the magnetic pole and the minimum inductance axis (see FIG. 4) in a double-salient electric motor as shown in FIG. 6.

Thus, even when the electric motor 5 has so-called double saliency, the rotor magnetic pole position θ can be excellently estimated.

In the above-mentioned first embodiment (FIG. 1), only the magnetic pole position estimation device for an electric motor is illustrated, but when the present invention is actually applied to a motor control system, the magnetic pole position estimation device shown in FIG. 1 is used while being built into an orderly driving control system of the electric motor 5. Accordingly, though a variety of circuit components or configurations (e.g., a current controller to be described later, etc.) not shown in FIG. 1 are associated with the configuration of FIG. 1, an explanation on the configuration of the entire control system is omitted here because of its complexity.

In addition, though in the above-mentioned first embodiment, the deviation angle ζ of the minimum inductance axis with respect to the rotor magnetic pole position θ is stored in the axis deviation table 7, a calculation section using a formula with the rotor magnetic pole position θ employed as an input parameter may be provided in place of the axis deviation table 7.

Moreover, though the outer product value is calculated from the current vector ($i_\alpha$, $i_\beta$) so as to extract a component orthogonal to the reference vector (α, β), another vector calculation method (e.g., coordinate transformation, etc.) having a similar function may instead be used.

Further, though the magnetic pole position is estimated by impressing an alternating voltage to the electric motor 5 and detecting and processing an alternating current generated, the magnetic pole position may be estimated by supplying an alternating current to the electric motor 5 and detecting and processing the alternating voltage generated, as described in the aforementioned first patent document, for example.

Embodiment 2

In the above-mentioned first embodiment, the axis deviation table 7 is provided that processes in consideration of only the periodic deviation angle ζ (the amount of deviation) corresponding to the electrical angle generated between the rotor magnetic pole direction θ (i.e., the rotor inverse-salient pole direction) of the electric motor 5 in the form of the double-salient electric motor (see FIG. 6) and the minimum inductance direction θ, but in view of the fact that the mode of the amount of periodic deviation is caused to change according to the motor current when the inductances of the rotor and the stator are changed by magnetic saturation due to the motor current, there may also be provided another axis deviation table that takes account of the change in the amount of the deviation due to the motor current.

In this case, since the change in the mode of the amount of deviation is uniquely decided by the motor current, if the relation of the change in the amount of deviation due to the motor current is obtained beforehand, a direction θ' in which the inductance in the present state is minimized can uniquely be obtained from the motor current and the rotor magnetic pole position θ.

Figure 2:
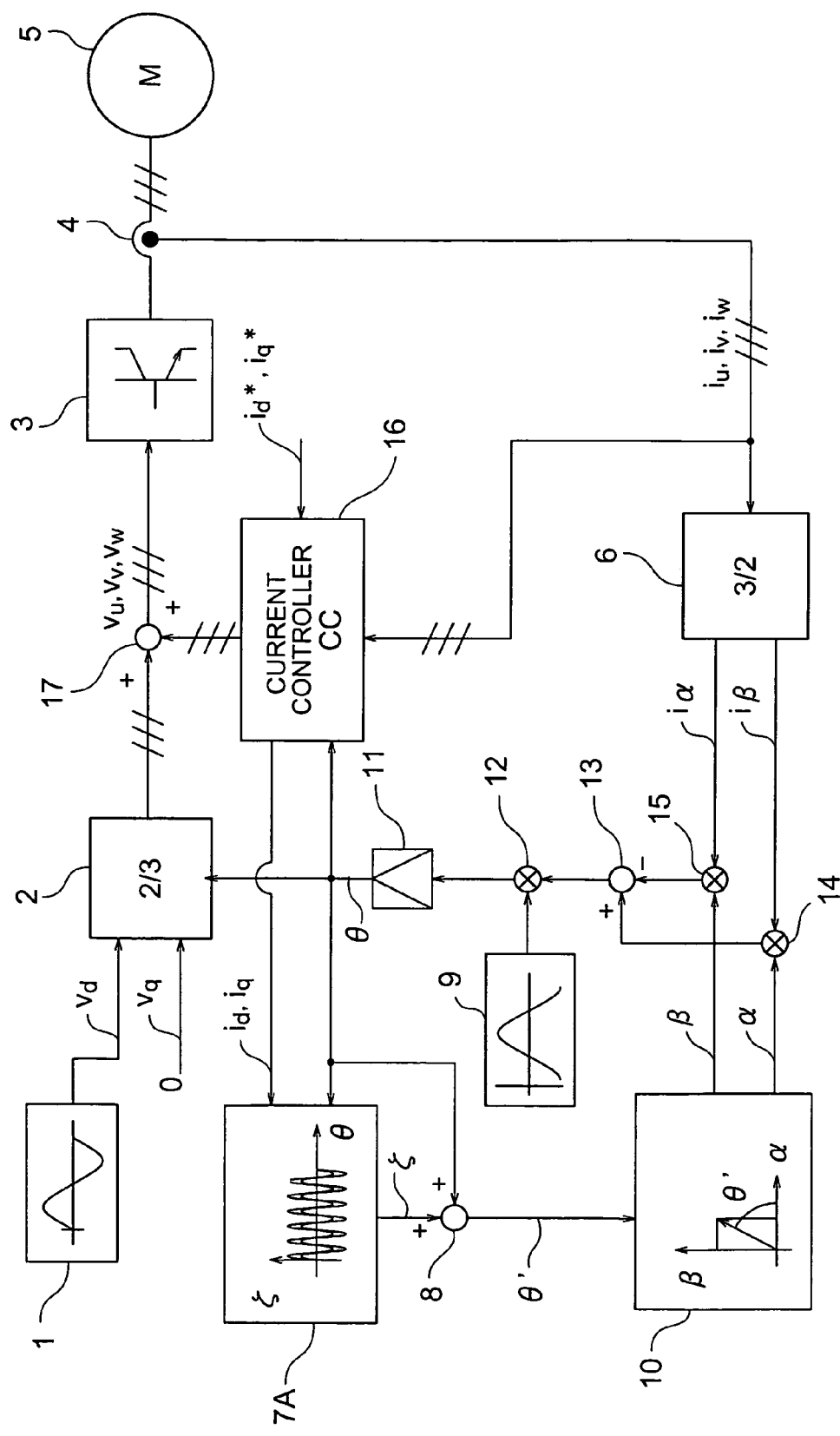
FIG. 2 is a circuit block diagram showing the functional configuration of a magnetic pole position estimation apparatus for a synchronous motor according to a second embodiment of the present invention.

FIG. 2 is a circuit block diagram that shows the functional configuration due to a magnetic pole position estimation apparatus for a synchronous motor according to a second embodiment of the present invention, in which an axis deviation table 7A serves to perform processing while taking account of a change in the amount of deviation due to a motor current.

In FIG. 2, the same parts or components as those described above (see FIG. 1) are identified by the same symbols or by the same symbols with "A" affixed to their ends, while omitting a detailed explanation thereof.

The magnetic pole position estimation apparatus for a synchronous motor according to the second embodiment of the present invention includes, in addition to an oscillator 1, a coordinate converter 2, a drive circuit 3, a current sensor 4, an electric motor 5, a coordinate converter 6, an axis deviation table 7A, an adder 8, a signal generator 9, a vector generator 10, a controller 11, a multiplier 12, a subtracter 13 and multipliers 14, 15, a current controller 16 and an adder 17 which are associated with the drive circuit 3 and the axis deviation table 7A.

In FIG. 2, there is illustrated, among the circuit components of the entire control system, the current controller 16 that is directly associated with the magnetic pole position estimation apparatus.

The current controller 16 is used for ordinary motor control, and serves to generate, as output signals, a motor current (id, iq) on a two axis rotation coordinate system (dq axes) and a voltage command on three phase fixed coordinates (UVW) from a motor current (iu, iv, iw), a rotor magnetic pole position θ and a current command (id*, iq*) in a two axis rotation coordinate system (dq axes) as input signals.

Specifically, the current controller 16 generates the voltage command on the three phase fixed coordinates (UVW) from the motor current (iu, iv, iw) on the three phase fixed coordinates (UVW) according to the current command (id*, iq*), and inputs the motor current (id, iq) in the two axis rotation coordinate system (dq axes) to the axis deviation table 7A.

The adder 17 adds the voltage command from the current controller 16 and an alternating signal for magnetic pole position estimation from the coordinate converter 2 to each other, and inputs the thus added result to the drive circuit 3 as an output voltage command (Vu, Vv, Vw).

At this time, the frequency of the alternating voltage used for magnetic pole position estimation is set higher than the current response frequency of the current controller 16 so as riot to cause interference between the current controller 16 and the magnetic pole position estimation according to the alternating voltage. Alternatively, there may be provided, as another countermeasure to avoid such interference, a filter in the current controller 16 for removing a high frequency component of the current signal.

The axis deviation table 7A stores the relation between the rotor magnetic pole position θ and the deviation angle ζ between the rotor magnetic pole position θ and the minimum inductance axis with respect to the motor current (id, iq), and obtains and outputs a deviation angle ζ from the motor current (id, iq) output from the current controller 16 and the rotor magnetic pole position θ output from the controller 11.

Hereinafter, similarly as described above, by performing the estimation calculation processing using the deviation angle ζ, the rotor magnetic pole position can be estimated to a high degree of precision without receiving the influence of the inductance change due to the motor current (iu, iv, iw).

Embodiment 3

In the above-mentioned first and second embodiments, the deviation angle ζ (the amount of deviation) is processed in consideration of the double saliency of the electric motor 5 on the basis of the rotor magnetic pole direction of an alternating current that is generated by an alternating voltage impressed in the rotor magnetic pole direction of the electric motor 5, but it may be possible to perform processing so as to make an alternating current, which is generated upon impression of an alternating voltage in a direction deviated from the rotor magnetic pole direction of the electric motor 5, coincide with the rotor magnetic pole direction by using a deviation angle of the alternating voltage.

Figure 3:
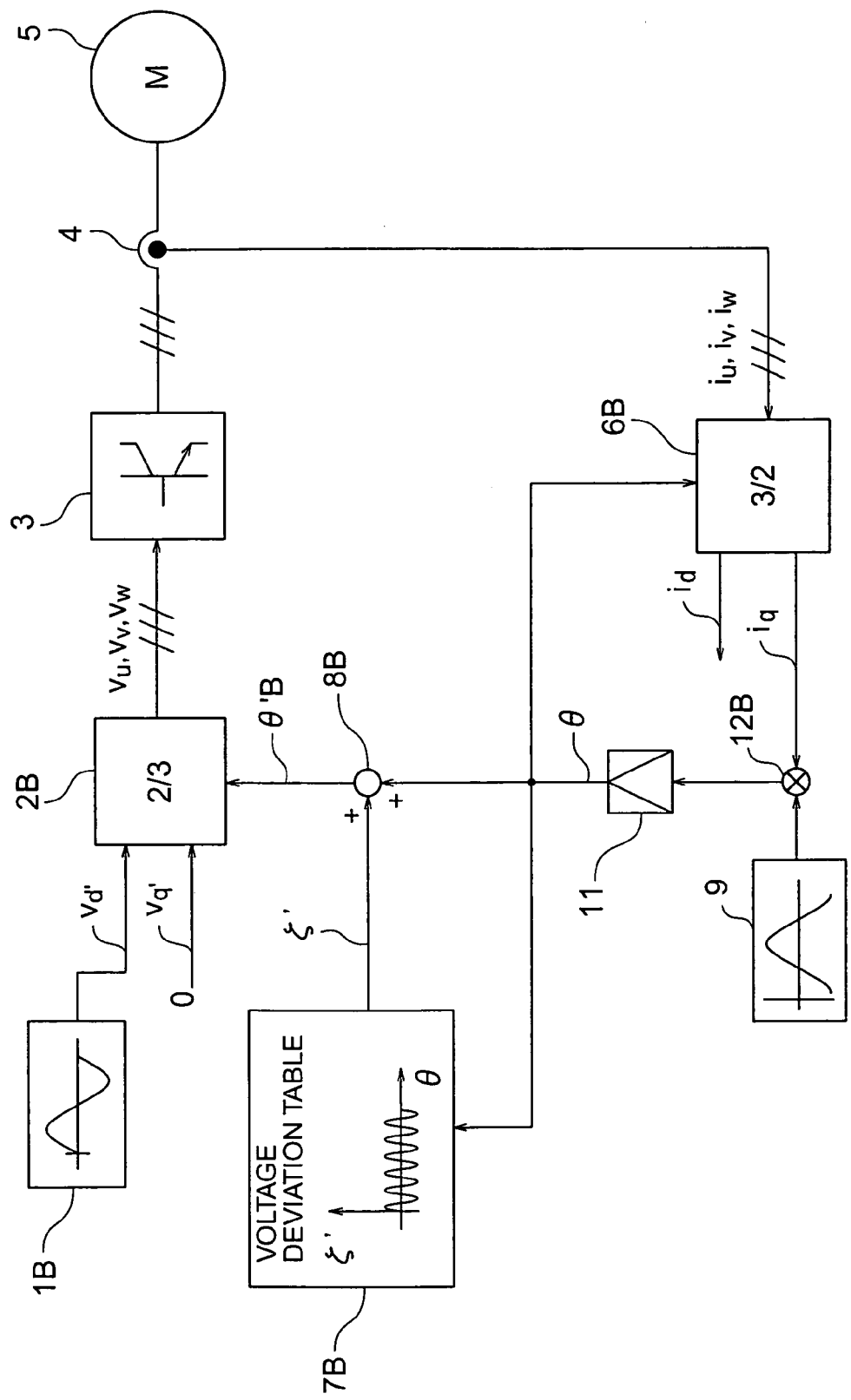
FIG. 3 is a circuit block diagram showing the functional configuration of a magnetic pole position estimation apparatus for a synchronous motor according to a third embodiment of the present invention.

FIG. 3 is a circuit block diagram that shows the functional configuration of a magnetic pole position estimation apparatus for a synchronous motor according to a third embodiment of the present invention, in which an alternating current is controlled to coincide with a rotor magnetic pole direction by using a deviation angle ζ' of an alternating voltage impression direction from the rotor magnetic pole direction.

In FIG. 3, the same parts or components as those described above (see FIG. 1) are identified by the same symbols or by the same symbols with "B" affixed to their ends, while omitting a detailed explanation thereof.

The magnetic pole position estimation apparatus for a synchronous motor according to the third embodiment of the present invention includes an oscillator 1B, a coordinate converter 2B, a drive circuit 3, a current sensor 4, an electric motor 5, a coordinate converter 6B, a voltage deviation table 7B, an adder 8B, a signal generator 9, a controller 11, and a multiplier 12B, similarly as stated above.

In this case, an alternating voltage Vd' (d axis signal) output from the oscillator 1B is impressed to the electric motor 5 in a direction deviated from the rotor magnetic pole direction.

The coordinate converter 2B coordinate transforms an input signal in the two axis rotation coordinate system (a d axis signal Vd' and a q axis signal Vq') into a voltage output value of three phase fixed coordinates in accordance with an alternating voltage impression direction calculated from the deviation angle ζ' and the rotor magnetic pole position θ.

The coordinate converter 6B constitutes a vector conversion section that serves to separate the motor current detected by the current sensor 4 into a parallel component and a quadrature component (dq) with respect to the rotor magnetic pole position θ, and outputs a two phase current vector (id, iq).

The multiplier 12B multiplies a q axis component iq of the current vector and the output signal of the signal generator 9 with each other, and inputs the result obtained to the controller 11. The other d axis component id of the current vector is used in an unillustrated control system.

The controller 11 obtains the rotor magnetic pole position θ from the multiplied value of the multiplier 12B, and inputs it to the voltage deviation table 7B, the adder 8B, and the coordinate converter 6B.

The axis deviation table 7 stores, as a table, the relation between the rotor magnetic pole position θ and the deviation angle ζ' between the rotor magnetic pole position θ and the alternating voltage impression direction, and outputs the deviation angle ζ' in accordance with the rotor magnetic pole position θ (estimated value).

The adder 8B constitutes an alternating voltage impression direction generation section, and obtains the alternating voltage impression direction θ'B by adding the deviation angle ζ' and the rotor magnetic pole position θ to each other and inputs it to the coordinate converter 2B as a reference direction.

Here, in case where the electric motor 5 is a double-salient electric motor (see FIG. 6), when an alternating voltage is impressed to the electric motor 5 in a direction coinciding with the rotor magnetic pole position θ, there arises a periodic deviation angle ζ corresponding to an electric angle between the rotor magnetic pole position θ (the rotor inverse-salient pole direction) and the minimum inductance direction θ', as stated above (see FIG. 1 and FIG. 2), and the deviation angle ζ thus generated is uniquely determined in accordance with the rotor magnetic pole position θ. As a result, an alternating current is generated in a direction deviated from the rotor magnetic pole position θ by the deviation angle ζ.

At this time, it is evident that by appropriately shifting the direction of the alternating voltage to be impressed to the electric motor 5 to a direction opposite to a shift direction due to the deviation angle ζ, it is possible to make the direction of the alternating current and the rotor magnetic pole direction θ coincide with each other. Accordingly, from the relation between the rotor magnetic pole direction (the rotor magnetic pole position θ) and the minimum inductance direction θ in the above-mentioned double-salient electric motor, a deviation angle ζ' of the alternating voltage impression direction that makes the direction of the alternating current and the rotor magnetic pole direction (the rotor magnetic pole position θ) coincide with each other is uniquely decided by the rotor magnetic pole position θ.

Accordingly, the voltage deviation table 7B stores the relation between the rotor magnetic pole position θ and the deviation angle ζ' of the alternating voltage impression direction, and the adder 8B obtains: an alternating voltage impression direction θ'B by adding the deviation angle ζ' and an estimated rotor magnetic pole position θ to each other, whereby the coordinate converter 2B coordinate transforms the alternating voltage generated by the oscillator 1B in accordance with the alternating voltage impression direction θ'B.

The motor current detected by the current sensor 4 is transformed from three phase fixed coordinates (UVW) into two phase rotation coordinates (dq axes) on the basis of the estimated rotor magnetic pole position θ in the coordinate converter 6B.

The multiplier 12B obtains a component of the motor current generated by the alternating voltage orthogonal to the rotor magnetic pole direction θ by multiplying the output signal from the signal generator 9 and the q axis component iq of the motor current output from the coordinate converter 6B, and inputs it to the controller 11.

Here, note that if the estimated rotor magnetic pole position θ and the actual rotor magnetic pole position coincide with each other, the direction of the generated alternating current and the rotor magnetic pole direction (rotor magnetic pole position θ) coincide with each other, so the output value of the multiplier 12B becomes "0".

On the other hand, when an error or deviation exists between the estimated rotor magnetic pole position θ and the actual rotor magnetic pole position, the output value of the multiplier 12B will have a value corresponding to the error or deviation.

Accordingly, by inputting an error signal from the multiplier 12B to the controller 11 thereby to perform appropriate control, the rotor magnetic pole position θ is made to coincide with the actual rotor magnetic pole position thereby to estimate and calculate the rotor magnetic pole position θ to a high degree of precision, as in the above-mentioned first and second embodiments.

In addition, in case of FIG. 3, if the estimated rotor magnetic pole position θ and the actual rotor magnetic pole position coincide with each other, any alternating current orthogonal to the rotor magnetic pole direction (the rotor magnetic pole position θ) is not generated. Accordingly, it is possible to avoid the generation of torque pulsation of the electric motor 5 resulting from the alternating current upon detection of the magnetic pole of the electric motor 5.

ADVANTAGES OF THE INVENTION

As described above, according to a magnetic pole position estimation apparatus for an alternating current synchronous electric motor of the present invention, provisions are made for an alternating voltage impression section for impressing an alternating voltage to an electric motor, a current detection section for detecting a current flowing through the electric motor in response to the alternating voltage, a reference direction generation section for adding a predetermined amount of deviation corresponding to a rotor magnetic pole position of the electric motor to the rotor magnetic pole position thereby to output a reference direction, a vector conversion section for separating the motor current detected by the current detection section into a parallel component and a quadrature component with respect to the reference direction, and a magnetic pole position estimation section for estimating an actual rotor magnetic pole position of the electric motor based on at least one of the parallel component and the quadrature component of the motor current. With such an arrangement, an influence resulting from the double saliency of the electric motor (i.e., an influence of a deviation of the axis of an alternating current due to the rotor magnetic pole position θ on the estimation of the magnetic pole position) can be eliminated, thus making it possible to estimate the magnetic pole position of the double saliency electric motor with a high degree of precision.

INDUSTRIAL APPLICABILITY

The present invention can be used as a magnetic pole position estimation apparatus for a synchronous motor which serves to estimate the rotor magnetic pole position of a double salient pole electric motor such as a permanent magnet motor, a synchronous reluctance motor, etc., in which a rotor and a stator of an alternating current synchronous electric motor have electric saliency.

The invention claimed is:

1. A magnetic pole position estimation apparatus for a synchronous motor comprising:
   an alternating voltage impression section for impressing an alternating voltage on an electric motor;
   a current detection section for detecting a current flowing through the electric motor in response to the alternating voltage;
   a reference direction generation section for adding a predetermined amount of deviation corresponding to rotor magnetic pole position of the electric motor, to the rotor magnetic pole position and any outputting a reference direction;
   a vector conversion section for separating the current detected by said current detection section into a parallel component and a quadrature component with respect to the reference direction; and
   a magnetic pole position estimation section for estimating actual rotor magnetic pole position of the electric motor based on at least one of the parallel component and the quadrature component of the current.

2. The magnetic pole position estimation apparatus for a synchronous motor as set forth in claim 1, wherein the reference direction which is obtained by adding the predetermined amount of deviation to the rotor magnetic pole position corresponds to a minimum inductance direction for the present state of the electric motor.

3. The magnetic pole position estimation apparatus for a synchronous motor as set forth in claim 1, wherein the reference direction which is obtained by adding the predetermined amount of deviation to the rotor magnetic pole position corresponds to a minimum inductance direction for the present state of the electric motor.

4. A magnetic pole position estimation apparatus for a synchronous motor comprising:
   an alternating voltage impression section for impressing an alternating voltage on an electric motor;
   a current detection section for detecting a current flowing through the electric motor in response to the alternating voltage;
   a reference direction generation section for adding a predetermined amount of deviation, corresponding to rotor magnetic pole position of the electric motor and a stator current of the electric motor, to the rotor magnetic pole position and outputting a reference direction;
   a vector conversion section for separating the current detected by said current detection section into a parallel component and a quadrature component with respect to the reference direction; and
   a magnetic pole position estimation section for estimating actual rotor magnetic pole position of the electric motor based on at least one of the parallel component and the quadrature component of the current.

5. A magnetic pole position estimation apparatus for a synchronous motor comprising:
   an alternating voltage impression direction generation section for adding a predetermined amount of deviation, corresponding to a rotor magnetic pole position of an electric motor, to a rotor magnetic pole position outputting a reference direction corresponding to an alternating voltage impression direction;
   an alternating voltage impression section for impressing an alternating voltage on the electric motor in the alternating voltage impression direction of the electric motor;
   a current detection section for detecting current flowing through the electric motor in response to the alternating voltage;
   a vector conversion section for separating the current detected by said current detection section into a parallel component and a quadrature component with respect to the rotor magnetic pole position; and
   a magnetic pole position estimation section for estimating actual rotor magnetic pole position of the electric motor based on at least one of the parallel component and the quadrature component of the current.

6. The magnetic pole position estimation apparatus for a synchronous motor as set forth in claim 5, wherein the reference direction which is obtained by adding the predetermined amount of deviation to the rotor magnetic pole position corresponds to a direction of impression of the alternating voltages in which an alternating current generated by the electric motor instantaneously coincides with the rotor magnetic pole position.

* * * * *